United States Patent [19]

Zarifé et al.

[11] Patent Number: 4,741,726
[45] Date of Patent: May 3, 1988

[54] POWER TRANSMISSION BELT

[75] Inventors: Victor Zarifé, Saint-Germain des Prés; Andre Cheymol, Dangé; Gilles Argy, La Quele en Yvelines, all of France

[73] Assignee: Hutchinson, Paris, France

[21] Appl. No.: 922,840

[22] Filed: Oct. 17, 1986

[30] Foreign Application Priority Data

Oct. 29, 1985 [FR] France ................................ 85 16039
Apr. 21, 1986 [FR] France ................................ 86 05698

[51] Int. Cl.⁴ .............................................. F16G 5/10
[52] U.S. Cl. .................................................. 474/268
[58] Field of Search ............... 474/268, 265, 263, 201, 474/270

[56] References Cited

U.S. PATENT DOCUMENTS 1,982,869 12/1934 Heyer .
3,120,409 2/1964 Beall .
3,968,703 7/1976 Bellmann ..................... 474/265 X
4,457,743 7/1984 Robecchi et al. ............. 474/268 X
4,493,681 1/1985 Takano ............................ 474/265

FOREIGN PATENT DOCUMENTS 084702 8/1983 European Pat. Off. .
533398 8/1931 Fed. Rep. of Germany .
1099528 9/1955 France .
1176766 4/1959 France .
962956 7/1964 United Kingdom .

OTHER PUBLICATIONS

Soviet Inventions Illustrated, Jun. 20, 1984, Resumé No. 84-119381/19; SU-A-1,033,794 (Jul. 8, 1983).

Primary Examiner—James A. Leppink
Assistant Examiner—Thuy M. Bui
Attorney, Agent, or Firm—Berman, Aisenberg & Platt

[57] ABSTRACT

A trapezoidal cross section cog belt comprising a rubber body having longitudinally spaced inner cogs, a longitudinally extending tension resisting girdle and transversally extending reinforcement members in said cogs, said members having a bandular open shape adapted to undergo deformation in the longitudinal direction of the belt when the same is in use.

21 Claims, 3 Drawing Sheets

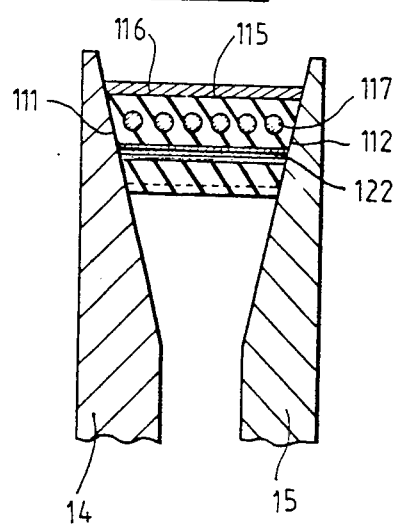
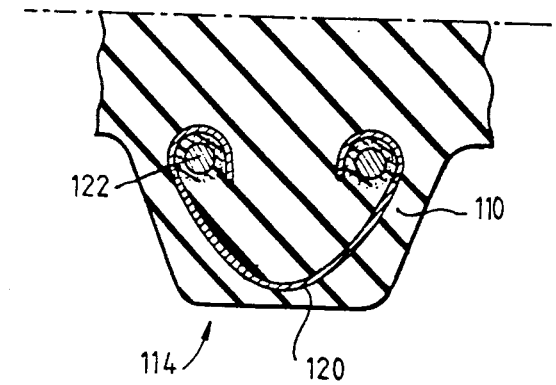
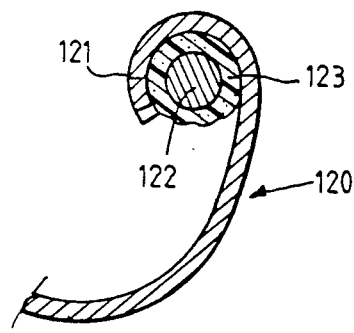

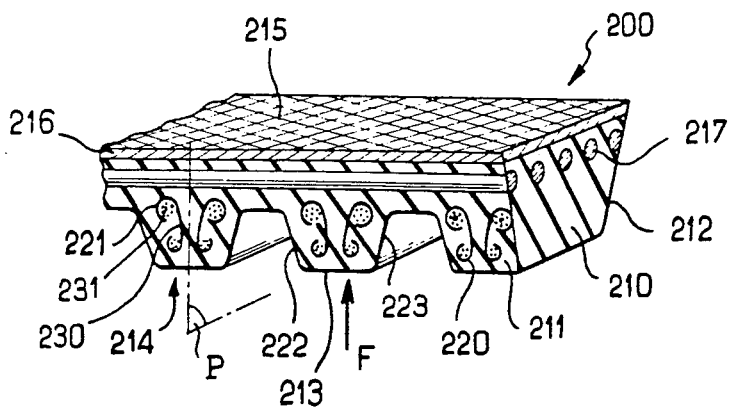
FIG_10
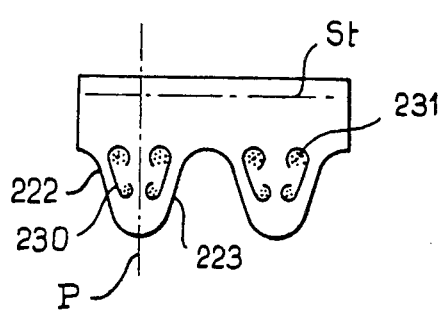
FIG_11
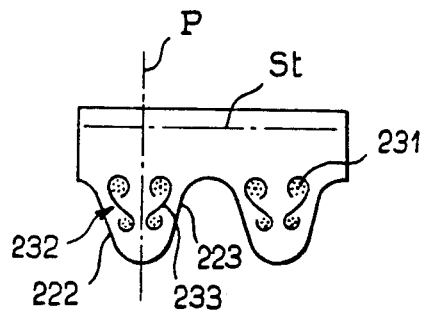
FIG_12
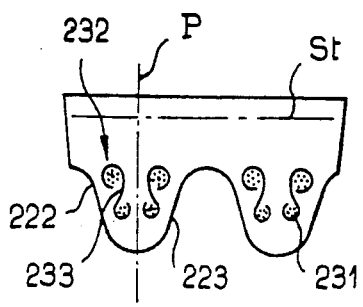
FIG_13
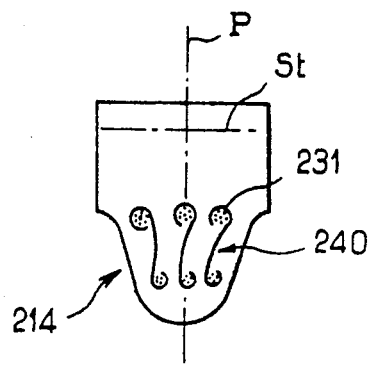
FIG_14

POWER TRANSMISSION BELT

BACKGROUND OF THE INVENTION

1. Field of the Invention

The invention relates to an improved power transmission belt.

It relates in particular to such a trapezoidal cross section cog belt adapted for use as endless power transmission member between two rotary members, one of which is integral with a driven shaft and the other with a driving shaft, for example, in a motor car gearbox or mechanical variator assemblies.

2. Description of the Prior Art

It has already been proposed to form such belts with a body of elastomeric material reinforced with a tension resisting girdle of textile fiber or metal wire cables or cords and, when special characteristics of flexibility of the belt are desired or in certain constructions provided for small winding diameters, transverse cogs on the internal surface, namely the one closest to the axes of the rotary members.

Such known belts, which are manufactured either by injection or by assembling together elastomer layers, cords and rubber coated fabric must, in use, satisfy requirements sometimes contradictory. They must in particular withstand different stress conditions for considerable periods of time, have a high modulus of elasticity under traction, a low modulus of elasticity under flexion and a high transverse mechanical strength. This latter condition is particularly important since, in the absence of sufficient transverse rigidity, the belt may curve during operation, and its cross section may be warped under the pressure of the flanges of the pulleys with which it cooperates and thus cease to play its power transmission role.

These phenomena are further accentuated in devices which require the transmission of a high power, for example greater than 10 kilowatts or so.

To attempt to solve the problem raised, which is that of transmission of a high power, while keeping the advantages of usual belt constructions, namely silent operation, good adhesion, good transmission efficiency and a satisfactory lifespan, as well as the good qualities of flexibility, heat resistance, damping of vibrations and space saving made possible by the internal transverse cogs, it has already been proposed to increase the transverse rigidity of said belts rather than increase their lateral contact surfaces, which would lead to the same result but is a solution which cannot be adopted for space saving reasons.

In order to obtain the desired increased transverse rigidity, it has already been suggested to add, to the rubber mixture forming the matrix body, short uniformly dispersed fibers oriented for the most part in the transverse direction of the belt so as to obtain an anisotropic mixture having a higher modulus in the transverse direction than in the longitudinal or radial direction. In such a solution, however, the value of the transverse ridigity which may be obtained is limited by the fact that the proportion of short natural or synthetic fibers may not exceed about 30% in volume, beyond which value there rapidly occurs a loss of cohesion of the rubber matrix-fiber assembly.

Therefore, other proposals have been made for increasing the transverse rigidity of such belts and, more particularly, the introduction of reinforcement members formed by layers of twisted textile cords oriented transversely or synthetic or natural fiber fabrics disposed on each side of the layer of the twisted cords forming the tension resisting girdle. Proposals of this type are described in No. FR-A-2 503 305, No. FR-A-2 083 034, No. EP-A-0 060 713, No. FR-A-2 484 037 and No. EP-A-0010990; they do not provide a complete solution either to the problem raised in that they do not give the required transverse rigidity to the belt, even though the reinforcement members are perfectly integrated in the elastomeric material forming the matrix body.

Other reinforcement members, for example those described in No. EP-A-84 702 can be placed in the cogs, that is to say in the transverse direction of the belt. They are formed by flat generally superimposed pieces disposed parallel to the base of the belt and are made from metal or from a synthetic material of a resin type. Such reinforcement members are not entirely satisfactory either because they create crack promoting zones in the cogs of the belt due to their flat shape and in addition promote the appearance of delamination zones at the interfaces of their connections with the elastomer matrix body.

To overcome this disadvantage, No. EP-A-84 702 further proposes reinforcing the cogs of the belt by rigid inserts with solid cross section or tubular cross section. The transverse rigidity required for correct resistance under compression of the belt is then obtained but to the detriment of the longitudinal flexibility which has to exist if the belt is to withstand the flexions to which it is subjected during use without damage, by rupture of the cohesion at the interface of the inserts and the elastomer matrix body.

Furthermore, when the reinforcing members used are tubular profiles with polyhedral cross sections such as squares, triangles, etc . . . the edges of these members corresponding to the apices of the polyhedra, in particular those disposed at the top part of the cogs—i.e. in the vicinity of the cable layer or girdle—induce stress concentration zones which result in damage of the elastomeric material forming the matrix body by fissuring the same with, as a result, a substantial reduction in the lifespan and the characteristics of such belts.

It is a primary object of the invention to provide a trapezoidal cross section cog belt of the type mentioned above, namely in which the transverse rigidity is obtained by means of reinforcing members provided in the cogs of the belt but which does not have the drawbacks of the devices of the prior art.

Another object of the invention is to provide such a cog belt which allows the transmission of high powers without however having its longitudinal flexibility adversely affected.

A further object of the invention is to provide such a belt whose useful life is as long if not longer than those of the prior art belts.

Another object of the invention is also to provide such a belt which may be manufactured without difficulty, and in a way substantially similar to known belts, so that it does not involve the creation of special and expensive tools and/or apparatus.

SUMMARY OF THE INVENTION

A trapezoidal cross section cog belt in accordance with the invention having a body formed of an elastomeric matrix material in which is embedded a longitudinally extending tension resisting girdle and, inside the cogs, reinforcement members directed substantially transversely with respect to the belt is characterized in that said members have, in cross section, a bandular "open" shape adapted to undergo deformation in the longitudinal direction of the belt when the same is in use.

When said members are shaped as a gutter with rolled or partially bent edges said rolled or bent edges are directed outwardly of the gutter.

In a modification, said edges are disposed inwardly of the gutter.

In one embodiment, said gutter has lateral and/or bottom faces which are themselves ribbed, or corrugated, so as to increase the transverse rigidity of the belt in which are inserted the reinforcement members.

Whatever the exact configuration of the reinforcement members, they are advantageously placed in each of the cogs of the belt with their lateral faces substantially parallel to the sides of the cogs in which they are incorporated.

In one embodiment, the "open" part of the reinforcement member is disposed so as to face the outside of the belt, so that the bottom of the reinforcement member is in the vicinity of the inside of the belt, i.e. close to the small dimension base of the cogs.

In another embodiment, the arrangement is the reverse of that described immediately above, namely the opening of the reinforcement member is directed inwardly of the belt.

The length of the reinforcement members is preferably chosen so as to be less than or substantially equal to the length of the cogs.

Furthermore, the reinforcement members are placed in the cogs—not only at the level of the cogs themselves but also in the connection zone of the latter to the body of the belt—so as to leave sufficient thicknesses of elastomeric material in order that the mechanical cohesion of the matrix body made from said material is not impaired.

A wide range of possibilities as to the nature and thickness of the reinforcement members chosen as a function of the transverse rigidity required for the desired transmission of a given power is available.

Thus, these reinforcement members may be of the metal type, for example made from stainless steel, aluminium or an aluminium alloy, a copper alloy, etc . . .

They may also be of the non metallic type, for example made of synthetic resins or resins and natural and/or synthetic fibers. In yet other embodiments, said reinforcement members are composite materials, including a plurality of interlocked layers, for example a laminate layer made of natural and/or synthetic fiber fabric, an elastomeric material and a metal strip.

Whatever the construction of the reinforcement members it has proved advantageous to introduce into the rolled or partially bent edges of said members inserts extending substantially from one side to the other of said belt.

It has been observed that providing these inserts in the rolled or partially bent edges of the reinforcement members opposed the deformation thereof, so that the transverse rigidity of the belt was further improved without its longitudinal flexibility being impaired.

The shape and dimensions of the inserts are chosen in correspondence of the dimensions of the rolled or partially bent edges of the reinforcement members and said inserts advantageously have a cross section with a circular or polygonal contour. The material forming these inserts is chosen on account of its mechanical strength and may be formed by metal wires, such as piano strings or braided twisted metal wires or twisted synthetic fiber threads such as the aramide ones known under the trademark KEVLAR (a trademark registered by DUPONT DE NEMOURS) or else cords made from rubber or other elastomers. For fixing said inserts in the reinforcement members of the cogs, the inserts are coated with a bonding agent or a rubber dissolution agent.

Not to oppose deformation of the elastomeric matrix body in the radial direction of the belt the reinforcement members are made as strip members with rolled or partially bent edges having, in cross section through a longitudinal plane, the general shape of a C shaped staple or an S shaped hook whose central web is offset with respect to the direction of the tension resisting girdle.

In such an embodiment, in which the reinforcement members have no part extending parallel to the girdle, there is no obstacle to deformation in the radial direction of the elastomeric matrix body.

The reinforcement members are preferably disposed so that their central web when C or S shaped is substantially parallel to a lateral face of the cog in which is it incorporated.

In preferred embodiment, the strip reinforcement members are associated by pairs in each of the cogs and the central web of the C or S cross section shaped member is disposed substantially parallel to the lateral face of the cog to which it is adjacent.

In a modification, the central web of the C or S shaped reinforcement member is disposed substantially parallel to the lateral face of the cog from which it is the furthest away.

In a modification relating to relatively large cogged belts, a plurality of strip reinforcement members, for example three or more, are provided in each of said cogs.

BRIEF DESCRIPTION OF THE DRAWINGS

The invention will be well understood from the following description, given by way of example with reference to the accompanying drawings in which:

FIG. 7 is a transverse sectional view on a reinforcing member of another embodiment;

FIG. 8 is a schematical front view, on a larger scale, of an improved belt cog of the invention;

FIG. 9 is a partial view on a yet larger scale;

FIG. 10 is a schematical perspective view of an improved belt part in accordance with the invention for yet another embodiment;

FIG. 11 is a schematical front view on a larger scale of two adjacent cogs of the belt according to FIG. 10;

FIG. 12 is a view similar to that of FIG. 11 but for a modification;

FIG. 13 is a view similar to that of FIGS. 11 and 12 but for an alternative embodiment; and FIG. 14 is a view similar to the three preceding ones but for another modification.

DESCRIPTION OF THE PREFERRED EMBODIMENTS

Figure 1:
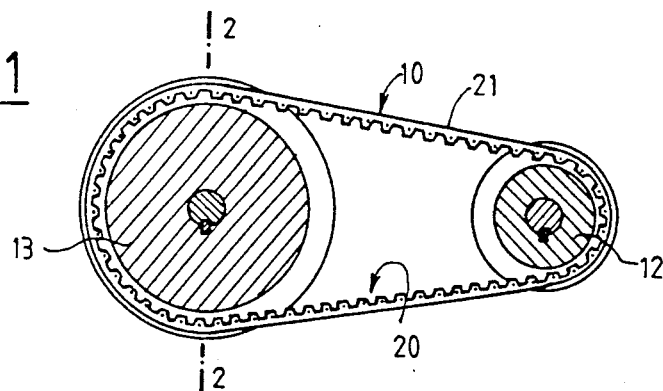
FIG. 1 is a schematical elevational view of a power transmission belt equipping a mechanical assembly.

As shown in FIG. 1, a trapezoidal cross section cog belt with bare sides 10 is used as a power transmission member between a driving member 12 and a driven member 13 formed one and/or the other by a pulley the flanges 14, 15 of which are fixed or adapted to undergo a translation movement and which belong to a mechanical assembly such as a gearbox or variator with variable transmission ratios likely to find application in the automobile industry field.

Figure 2:
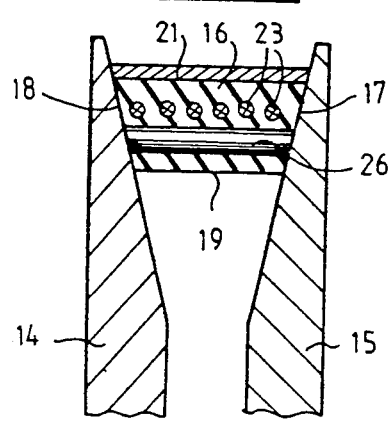
FIG. 2 is a partial sectional view but on a larger scale, along line 2—2 of FIG. 1.
Figure 3:
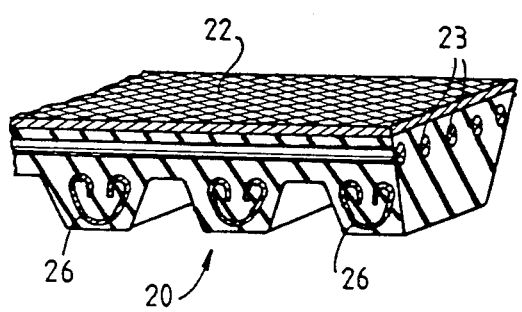
FIG. 3 is a partial perspective view of an improved cog belt according to the invention, in a first embodiment.

In the embodiment illustrated in FIGS. 1, 2 and 3, belt 10 includes a matrix body 16 made from an elastomeric material such as natural rubber (NR), synthetic rubber such as polychloroprene, nitrile rubber, styrene-butadiene copolymers (SBR), hydrine, etc . . . with trapezoidal cross section and bare sides 17 and 18. The internal face 19 of matrix body 16 is cut so as to provide cogs 20 and its external face 21 may be covered with one or more layers of rubber coated fabric 22, for example with a polychloroprene coated cotton base.

Figure 4:
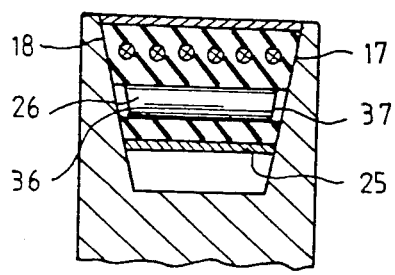
FIG. 4 is a view similar to that of FIG. 2 but for a modification and another mechanical assembly.

In a modification, schematically shown in FIG. 4, the internal face 19 of the trapezoidal cross section belt is also covered with a rubber coated fabric 25 similar to fabric 22, when the latter is present.

In matrix body 16 is embedded a girdle made of a layer of twisted threads, cords or wires, made for example from steel, or from synthetic material threads such as polyester, aramide fibers such as known as KEVLAR or rayon threads.

In each of cogs 20 is provided a reinforcement member 26 intended to give the belt sufficient transverse rigidity for transmission of the desired power and, in accordance with the invention, reinforcement members 26 are formed as "open" shaped bandular means, namely having somewhat the shape of a gutter with rolled, or partially bent edges, made from metal, from a synthetic material or from a composite material, and which is adapted to undergo deformation in the longitudinal direction of the belt.

By longitudinal deformation in the direction of the belt one means here a deformation of the reinforcement members such that their lateral faces follow the deformation of the cogs due to traction of the belt during its passage in the grooves of the pulleys.

Figure 5:
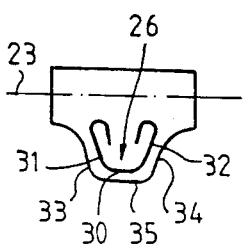
FIG. 5 is a partial schematical view, in elevation, of a belt cog of the invention.
Figure 6A:
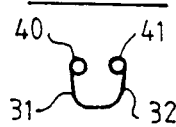
FIGS. 6a to 6f illustrate different forms of reinforcement members for use in an improved belt of the invention.
Figure 6B:
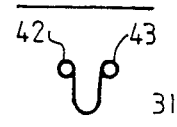

More precisely, and as shown in FIG. 5, the reinforcement members 26 have a general U shaped cross section, with bottom 30 and lateral faces 31 and 32 whose ends are curved, either inwardly of the gutter, as shown in FIG. 5, or outwardly, as shown in FIG. 6b.

Figure 5A:
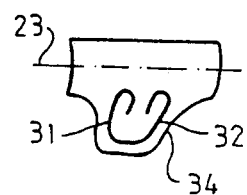
FIG. 5a is a view similar to FIG. 5 but for another condition of a cog of the belt.

As can be seen in FIG. 5, the reinforcement members 26 are disposed in the cogs 20 so that the lateral faces 31 and 32 are directed substantially parallel to the lateral faces 33 and 34 of the cogs, whereas bottom 30 is directed substantially parallel to the internal face 35 of said cogs. This condition, which is that of manufacture, is also that of the free part of the belt, whereas in the condition of passage through the groove of the pulleys the condition is as shown in FIG. 5a in which the reinforcement member is deformed in the longitudinal direction of the belt but unequally on its two faces.

The length of reinforcement members 26 is less than or substantially equal to the width of the belt, the longitudinal ends 36 and 37 of the reinforcement members being flush with the bare sides 17 and 18, respectively, of the belt, as shown in FIG. 2 or, being slightly set back with respect thereto, as shown in FIG. 4.

The cross section of reinforcement members 26 may be as shown in FIGS. 6a to 6f, without these representations having any limitative character.

Figure 6C:
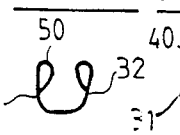

Thus, the lateral faces 31 and 32 of reinforcement members 26 may be terminated by rolled portions 40, 41, housed "inside" the U section of the reinforcement member, FIG. 6a, or by rolled portions 42 and 43 disposed "outside" the U section, FIG. 6b, or by flaps 50, directed "inside" the U section rather than rolled portions, FIG. 6c.

Figures 6D, 6E, 6F:
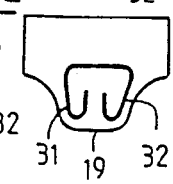

In the embodiment shown in FIG. 6d, where the reinforcement members include rolled portions 40 and 41 directed inwardly, the bottom joining together the lateral faces 31 and 32 is complementarily stiffened by a longitudinal rib 44 whereas such ribs 45 and 46 are provided not only on the bottom of the reinforcement but also on the lateral faces in the embodiment of FIG. 6f. In each of the above described embodiments, the reinforcement members 26 are disposed so that their bottom 30 is placed in the vicinity of the internal face 19 of the belt, that is to say that, as shown in the drawings, the "open" parts of the reinforcement members are facing the external face of the belt.

In another embodiment, as shown in FIG. 6e, the "open" part of the reinforcement members may be directed so as to face the internal face 19 of the belt, the lateral faces 31 and 32 of the reinforcement member being here also, however, placed substantially parallel to the lateral faces 33 and 34 of cog 20.

The reinforcement members 26 may be made from metallic materials, such as stainless steel, aluminium or aluminium alloys, or copper alloys.

Alternatively, reinforcement members 26 are made from synthetic resins, pure or reinforced with natural and/or synthetic fibers.

In another modification, the material forming reinforcement members 26 is a fabric, elastomer and metal strip laminate.

Whatever the material forming the reinforcement members its thickness is chosen as a function of the transverse resistance to compression which it is desired to give to the power transmission belt, which resistance is itself chosen as a function of the power to be transmitted.

Thus, for metal reinforcement members 26 satisfactory results are obtained with members whose thickness is as shown in the following table.

| Power | Thickness (mm) | |
| --- | --- | --- |
| Kw | Stainless steel | Aluminium |
| 10 to 25 | 3/100 to 1/10 | 1/10 to 3/10 |
| 25 to 50 | 1/10 to 2/10 | 3/10 to 5/10 |
| 50 to 100 | 2/10 to 5/10 | |

In case of a laminate type reinforcement members, it is the thickness of the metal strip which is taken into account for determining the transmissible power.

When non metallic reinforcement members are used satisfactory results have been obtained for transmitting power of about 50 Kw with a material formed by an epoxy resin in which are embedded glass fibers (25 threads of 2400 tex with a resin proportion of 30%).

The height of reinforcement members 26 is generally at most equal to half the thickness of the belt and good results have been obtained with reinforcement members such as defined above, of a height between 4 and 7 mm and a distance from the lateral faces 31, 32 to mid height of the reinforcement member between 3 and 6 mm.

The belt of the invention is manufactured as for usual cog belts, namely by forming a sleeve on a mandrel and cutting up said sleeve by means of tools which attack it at an angle of $\mp 13°$ so as to give to the sides of the belt the desired angle of 26°.

In such a manufacturing process which makes use of a splined mandrel, a thin layer of elastomeric material or a first layer of rubber coated fabric is placed on the bottom then an elastomer layer is disposed on the first one then the reinforcement members 26 previously filled and coated with the elastomeric material, for example by means of a plasticizing machine, are disposed on said layers then new elastomer layers, are put on the reinforcement members, then on these layers the girdle, then new elastomer layers and the rubber coated fabric forming the external face of the belt are then added, the whole assembly then being vulcanized and cut up.

In the embodiment illustrated in FIGS. 7 to 9, the elastomeric material matrix body 110 is cut on its internal face so as to form cogs 114 and its external face 115 is eventually covered with one or more layers of rubber coated fabric 116, for example with a cotton base, a layer of twisted cables 117 serving as tension resisting girdle.

In each of cogs 114 is housed a reinforcement member 120, FIG. 8, with free edges 121, FIG. 9, rolled or partially bent inwardly or outwardly of the gutter shaped member and in which are housed inserts 122 with circular or polygonal cross section which extend in cogs 114 from one side 111 to the other 112 of the belt, FIG. 7.

The inserts 122 may be formed of cords of metal wires, such as piano strings or braided twisted metal wires, twisted aramide fiber threads such as those known under the trademark KEVLAR or else cords made from rubber or other elastomeric materials.

For their positioning in the reinforcement members 120 and in cogs 114, the inserts 122 are advantageously coated with a bonding agent or a rubber dissolution agent forming a sheath 122 interposed between the reinforcement member 120 and its free edges 121, FIG. 9.

The inserts 122, which oppose deformation of the free edges of reinforcement member 120—without however opposing deformation of said reinforcement members in the longitudinal direction of the belt during passage thereof between the flanges 14 and 15 of the pulley—add to the transverse rigidity of the belt without impairing its longitudinal flexibility.

In the embodiment shown in FIGS. 10 to 14, the elastomeric material matrix body 210 has a trapezoidal cross section and bare sides 211 and 212. Matrix body 210 is cut ofl its inner face 213 to define cogs 214 and its external face 215 is eventually lined with one or more layers of rubber coated fabric 216, for example with a cotton base. In matrix body 210 is embedded a girdle made of a layer of cables 217 serving as tension resisting means and having a structure similar to that of the previously described embodiments.

In each of cogs 214, limited by lateral faces 222 and 223, are provided reinforcement members 220 formed by shaped strip members made from metal or a metal alloy, or from an elastomer fabric and metal strip laminate, or from synthetic resin reinforced or not, or from composite materials of this type whose cross section is not a closed curve but has a somewhat wavy contour, with rolled or partially bent edges 221. More precisely, the reinforcement members 220 have, in cross section through a mean longitudinal plane, a general form of a C shaped staple or an S shaped hook, as can be clearly seen in FIGS. 11 and 12, repectively, and they are disposed in cogs 214 so that their central web is offset with respect to the direction of the girdle 217, so that they do not introduce any resistance likely to oppose deformation of the elastomeric matrix body 210 in the radial direction, which is the one shown by arrow F in FIG. 10.

The central web of the C or S shaped member is disposed in cogs 214 so as to be directed substantially parallel to a lateral face 222 or 223 of each of the cogs.

In the embodiment shown in FIG. 10, which resorts to C section shaped members, disposed in pairs in each cog on each side of the mean transverse plane P of the cog the central web 230 of each of the reinforcement member is closer to plane P than the edges 221, inside which may be disposed inserts 231 extending substantially from one side to the other of the belt, as for the embodiments shown in FIGS. 7 to 9.

In the embodiment of FIG. 11, the reinforcement members are disposed mirrorwise with respect to the mean plane P of each cog but with their web 230 directed substantially parallel to the lateral face 222 or 223 of each cog to which they are adjacent and closer to said faces than said plane P.

In the embodiment shown in FIG. 12, the strip members 232 have an S shaped hook cross section, with a central web 233 offset with respect to the longitudinal direction of the girdle, shown at St. As in the embodiments of FIGS. 10 and 11, the reinforcement members 232 are, in each cog disposed with their central web directed substantially parallel to the lateral face 222 or 223 of the cog in which they are incorporated.

In the embodiment shown in FIG. 13 which also uses S section shaped reinforcement members, the arrangement in each cog of said reinforcement members is symmetrical with respect to the mean transverse plane P. In this embodiment however and contrary to that shown in FIG. 12, the central web 233 of the reinforcement member 232 the closest to the lateral face 222 is disposed parallel to the other lateral face 223 of the cog in which said reinforcement member is inserted.

In the embodiment shown in FIG. 14 which relates to a cog belt 214 of larger size than those of the previously described embodiments, the reinforcement members 240 also have an S section shape and are disposed in each cog slanted with respect to the direction St of the tension resisting girdle on each side of the mean transverse plane P of the cog and substantially in said plane, the reinforcement members being associated in threes in each cog and no longer in pairs as in the preceding embodiments.

What is claimed is:

1. A trapezoidal cross section cog power transmission belt having an elastomeric material matrix body with inner longitudinally spaced cogs, a longitudinally extending tension resisting girdle embedded in said body outwardly of said cogs and reinforcement members in said cogs extending substantially transversely with respect to the belt, said reinforcement members having a bandular open shape comprising rolled or partially bent edges adapted to undergo deformation in the longitudinal direction of the belt when the same is in use.

2. The belt as claimed in claim 1, wherein said reinforcement members have an open gutter shape with rolled or partially bent edges directed inwardly of the gutter.

3. The belt as claimed in claim 1, wherein said reinforcement members have an open gutter shape with rolled or partially bent edges directed outwardly of the gutter.

4. The belt as claimed in claim 1, wherein said reinforcement members are at least partially corrugated to increase the transverse rigidity of said belt.

5. The belt as claimed in claim 1, wherein said reinforcement members are placed in each cog with their lateral faces substantially parallel to the faces of the cogs in which they are incorporated.

6. The belt as claimed in claim 1, wherein the open part of a reinforcement member is facing the outward surface of the belt.

7. The belt as claimed in claim 1, wherein the open part of a reinforcement member is facing the inward face of the belt.

8. The belt as claimed in claim 1, wherein the length of the reinforcement members is substantially equal to the width of the belt.

9. The belt as claimed in claim 1, wherein the reinforcement members are made from a metallic material chosen in the class comprising stainless steel, aluminium, aluminium alloys and copper alloys.

10. The belt as claimed in claim 1, wherein the reinforcement members are made from a material chosen in the class comprising synthetic resins and fiber reinforced resins.

11. The belt as claimed in claim 1, wherein said reinforcement members are made from a composite laminate material, including a fiber fabric, elastomer and a metal strip.

12. The belt as claimed in claim 1, including at least one layer of rubber coated fabric covering said body on its external face.

13. The belt as claimed in claim 1, wherein the thickness of the material forming the reinforcement members is between 3/100th and 6/10th mm.

14. The belt as claimed in claim 2, further comprising inserts made of cords chosen in the class comprising metal wires, braided metal wires, synthetic fiber threads and elastomeric braids extending substantially from one side to the other of said cogs and housed in said rolled or partially bent edges of said reinforcement members.

15. The belt as claimed in claim 3, further comprising inserts made of cords chosen in the class comprising metal wire, braided metal wires, synthetic fiber threads and elastomeric braids extending substantially from one side to the other of said cogs and housed in said rolled or partially bent edges of said reinforcement members.

16. The belt as claimed in claim 14, or claim 15, wherein said inserts are coated with a bonding agent or a rubber dissolution agent which forms a sheath between the lateral faces of said reinforcement members and their rolled or partially bent edges.

17. The belt as claimed in claim 1, wherein said reinforcement members are formed by strip members having a C shaped staple or S shaped hook cross section with a central web, said web being in each cog slanted with respect to the direction of the tension resisting girdle so that they cause no obstacle to deformation of the elastomeric matrix body in the radial direction of the belt.

18. The belt as claimed in claim 17, wherein said reinforcement members are disposed in each cog in which they are incorporated with their central web directed substantially parallel to a lateral face of said cog.

19. The belt as claimed in claim 17, wherein the reinforcement members are associated by pairs in each cog in which they are incorporated.

20. The belt as claimed in claim 19, wherein, said reinforcement members are disposed in each cog with mirror symmetry with respect to the mean transverse plane of said cog.

21. The belt as claimed in claim 17, wherein, the strip reinforcement members are grouped together in a multiplicity of at least three members in each cog in while they are incorporated.

* * * * *